C. P. BYRNES.
APPARATUS FOR MAKING VACUUM BOTTLE BLANKS.
APPLICATION FILED MAR. 18, 1912.

1,266,401.

Patented May 14, 1918.
2 SHEETS—SHEET 1.

WITNESSES

INVENTOR
Clarence P. Byrnes

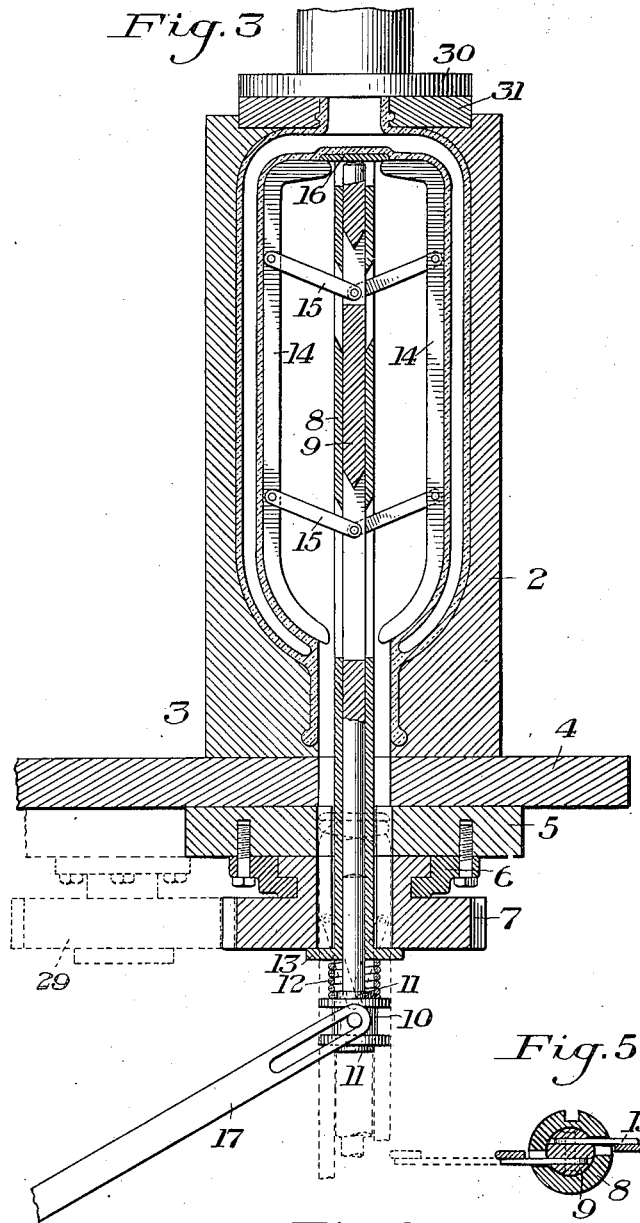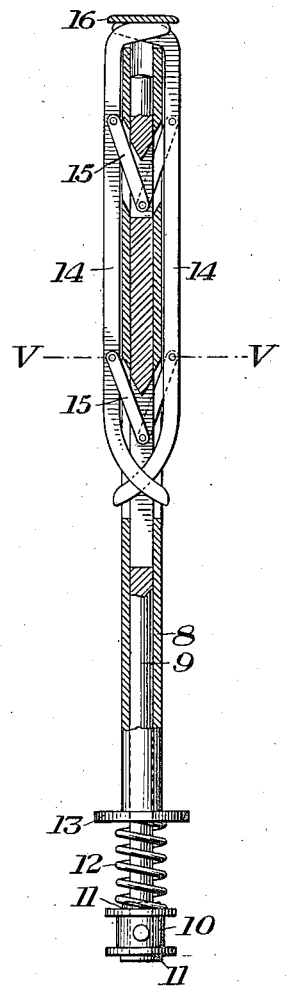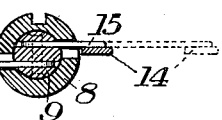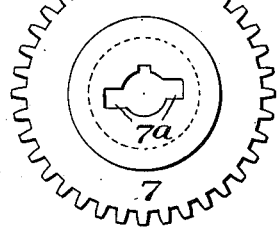

UNITED STATES PATENT OFFICE.

CLARENCE P. BYRNES, OF SEWICKLEY, PENNSYLVANIA.

APPARATUS FOR MAKING VACUUM-BOTTLE BLANKS.

1,266,401.

Specification of Letters Patent.   Patented May 14, 1918.

Application filed March 18, 1912.   Serial No. 684,525.

*To all whom it may concern:*

Be it known that I, CLARENCE P. BYRNES, a resident of Sewickley, in the county of Allegheny and State of Pennsylvania, have invented a new and useful Improvement in Apparatus for Making Vacuum - Bottle Blanks, of which the following is a full, clear, and exact description, reference being had to the accompanying drawings, forming part of this specification, in which—

Fig. 3 is an enlarged vertical section showing the expanding step;

Fig. 4 is a side elevation partly in section showing the expanding tool in collapsed position;

Fig. 5 is a cross section on the line V—V of Fig. 4; and

Fig. 6 is a detail view of the driving gear wheel.

Figure 1:
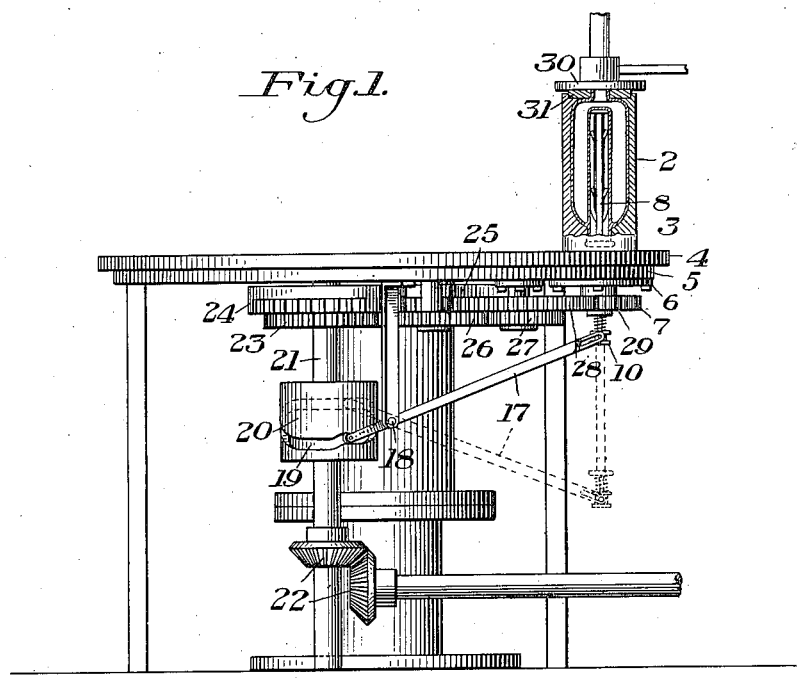
Figure 1 is a side elevation showing my invention applied to a Miller type of glass pressing and blowing machine.
Figure 2:
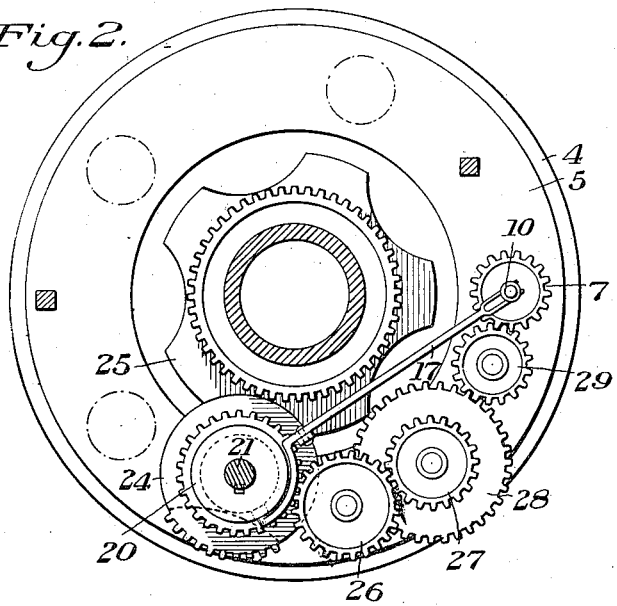
Fig. 2 is a horizontal cross section looking upwardly.

My invention relates to the manufacture of blanks for vacuum bottles, and it is designed to provide simple and improved apparatus therefor, as well as an assembled pressing and blowing machine for this purpose.

The object of the invention is to simplify and improve the method of expanding the inner receptacle, while limiting or fixing the amount of such expansion. To that end, it consists in mechanically expanding the walls of the inner receptacle, as distinguished from forcing in an expanding fluid, such as air. By mechanically expanding, the amount of expansion will be fixed by the expanding tool, and there is no necessity for inserting a mold body against which the inner receptacle is blown, as has been heretofore proposed. The operation is thus made much simpler and cheaper.

In carrying out the invention, a glass blank is pressed in the usual manner and this blank is then suspended, preferably by the mold ring, within a blow mold. The blank is then expanded within the blow mold in the usual manner to form the outer wall of such receptacle, the mouth of such receptacle being formed at the opposite end from that of the blow head. At the same time or thereafter, or partly at the same time and partly thereafter, the inner receptacle is expanded by a mechanical expanding device which is forced up through the mouth-forming end of the blow mold and expanded to swell out the inner receptacle. This mechanical expanding device is then collapsed and withdrawn, when the entire blank may be removed from the blow mold.

The invention may be carried out by the use of hand molds, but I prefer to apply the method to the well known Miller type of glass pressing and blowing machines, wherein the blank is carried to successive stations on a rotary table.

In the drawings, in which I have shown the changed portion of the machine, 2 represents a blow mold at the blowing station, 3 the blow head, and 4 the usual rotary table. This rotary table is provided with a series of holes so that at the blowing station, the expanding tool shown in Fig. 4 may be forced up to close the bottom hole in the blow mold and to then rise and expand the inner wall or receptacle. At the blowing station, beneath the hole in the table, is a support 5, having a suitable depending bearing 6, to receive a toothed wheel 7, having spline connection with the tubular stem 8 of the expanding tool. Within the tubular stem 8 of this tool is a sliding rod 9, which projects downwardly below the tubular stem and is provided with a recessed collar 10, loosely held between flanges 11 on the rod. A spring 12 placed between the upper flange 11 and an annular flange 13 on the sleeve 8 normally holds the rod 9 depressed, thus holding the expanding device collapsed. The expanding members 14, of which preferably two are used, are connected by links 15 to the inner rod 9. This rod is suitably slotted, to receive the pivots, and also to receive portions of the links of the expanding members when collapsed. The links also extend through slots in the outer sleeve 8 and at the top of the sleeve is provided a disk 16, which forms the top of the tool. The diameter of this disk is preferably about the same as the extreme diameter of the expanding members when collapsed, and the holes through the table 4 and bearing are shaped to neatly fit this disk. The sliding collar 10 is held against rotation and is moved vertically by a cam lever 17, pivoted at 18 and having its other end provided with a roller entering the cam groove 19 in the cam sleeve 20, secured to shaft 21. The shaft 21 has a bevel gear drive 22, and in addition to the cam carries at its top a toothed wheel 23, and a mutilated gear disk 24, which forms part of the Geneva gear, the other part 25 being mounted on the table support or carrier. The gear 23 connects through intermediate gears 26, 27, 28 and 29 with the gear 7, splined to the tubular shaft 8. This shaft is therefore continuously driven at all times and the expanding tool is moved at suitable intervals upwardly within the blow mold or drawn down until its upper end clears the lower face of the table, the table being rotated intermittently. Of course, any suitable driving connections may be provided for rotating the expanding tool. The gear wheel 7 has fixed slots 7ª to admit the expanding members 14 when the tool is withdrawn.

In the use of the apparatus, the blank is pressed in the usual way on a Miller machine, and is then taken around to the blowing station where it is hung in a blow mold. The blow head 30 is then brought down on the mold ring 31, carrying the blank, and air pressure is supplied to blow the outer wall of the article to shape within the blow mold and form the mouth and neck. During this operation, the glass is blown down into the mouth and neck portion, and the plunger and expanding tool are then moved upwardly by the cam, thus forming the open mouth and the inner receptacle, by the pressing action of the plunger. When the washer 13 strikes the lower side of the wheel 7, the expanding will then begin, as the expanding members will be forced out by the relative movements of the tube and inner rod. The parts will then assume the position shown in Fig. 3, thus expanding the inner wall of the receptacle. During all this time, the expanding tool is rotating and after the expansion is completed, the first downward movement of the cam lever collapses the tool, through the action of the spring, into the form of Fig. 4, and then withdraws it downwardly to a point where the disk 16 is below the lower face of the table, as indicated by the dotted line in Fig. 3. The table is then turned intermittently by the Geneva gear to bring the next blank into blowing position and carry the blank already blown and expanded on to the next station.

The advantages of my invention result from the mechanical expanding of the inner receptacle, while thus doing away with the necessity for a mold or forming surface against which the inner receptacle is blown, to limit its expansion. The operations are thus greatly simplified, cheapened and made more rapid. Within the scope of my claims for the assembled machine the inner blank may be expanded by air.

The blanks may be made without the use of a pressing and blowing machine, different types of machines may be used, and different mechanical devices for expanding may be employed, without departing from my invention.

I claim:

1. In apparatus for forming hollow wall receptacles, a blow-mold having both ends open and a mechanical expanding device movable through one end thereof and arranged to expand the wall of the inner blank into a spaced relation with the wall of the outer blank; substantially as described.

2. In apparatus for forming hollow wall receptacles, a blow-mold, a blow head coöperating with one end thereof, and a plunger having a mechanical expanding device arranged to reciprocate through the other end; substantially as described.

3. In apparatus for forming hollow wall receptacles, a blow-mold having openings at both ends, a blow head coöperating with one end thereof, and a plunger movable through the other end thereof and having a mechanical expanding device arranged to expand the wall of the inner blank to a spaced relation from the wall of the outer blank; substantially as described.

4. In a machine for forming vacuum bottle blanks, a pressing station, a blowing station having a separate blow-mold, means for transferring the blank from the pressing station into the blow-mold at the blowing station, said mold being open at both ends, and mechanical means at the blowing station for expanding the wall of the inner blank into spaced relation with the wall of the outer blank; substantially as described.

In testimony whereof, I have hereunto set my hand.

CLARENCE P. BYRNES.

Witnesses:
R. M. CONWAY,
H. M. CORWIN.